(12) United States Patent
Hiraki et al.

(10) Patent No.: US 8,098,462 B2
(45) Date of Patent: Jan. 17, 2012

(54) MANUFACTURING METHOD OF THIN-FILM MAGNETIC HEAD, WAFER FOR THIN-FILM MAGNETIC HEAD AND THIN-FILM MAGNETIC HEAD

(75) Inventors: Tetsuya Hiraki, Tokyo (JP); Yoshiaki Tanaka, Tokyo (JP); Yuji Otsubo, Tokyo (JP); Sohei Horiuchi, Tokyo (JP)

(73) Assignee: TDK Corporation, Tokyo (JP)

( * ) Notice: Subject to any disclaimer, the term of this patent is extended or adjusted under 35 U.S.C. 154(b) by 428 days.

(21) Appl. No.: 12/361,877

(22) Filed: Jan. 29, 2009

(65) Prior Publication Data
US 2010/0321822 A1 Dec. 23, 2010

(51) Int. Cl.
*G11B 5/33* (2006.01)
(52) U.S. Cl. .................................................. 360/313
(58) Field of Classification Search ............. 360/313.33
See application file for complete search history.

(56) References Cited

U.S. PATENT DOCUMENTS

| | | | |
|---|---|---|---|
| 6,274,222 B1 * | 8/2001 | Sasaki et al. | 428/141 |
| 7,092,212 B2 | 8/2006 | Onodera | |
| 7,902,638 B2 * | 3/2011 | Do et al. | 257/620 |
| 7,903,378 B2 * | 3/2011 | Takahashi et al. | 360/313 |

FOREIGN PATENT DOCUMENTS

JP 7-32705 6/1995
* cited by examiner

*Primary Examiner* — Hoai V Ho
*Assistant Examiner* — Min Huang
(74) *Attorney, Agent, or Firm* — Frommer Lawrence & Haug LLP

(57) ABSTRACT

A manufacturing method of a thin-film magnetic head, includes a step of forming many thin-film magnetic heads arranged along row and column directions on a wafer, each of the thin-film magnetic heads having a read head element, a write head element, and pairs of probe-use pads electrically connected with the read head element and the write head element, respectively, the pairs of probe-use pads being positioned so that at least part of each probe-use pad is removed by a cutting process along the row direction, a step of obtaining a plurality of row-bars by cutting the wafer along the row direction so that the at least part of each probe-use pad is removed, each of the obtained row-bars having the thin-film magnetic heads aligned in the row direction, a step of forming pairs of bonding pads electrically connected with the read head element and the write head element, respectively, on a surface opposite to an ABS of each thin-film magnetic head of each of the row-bars, and a step of cutting each row-bar along the column direction to separate into individual thin-film magnetic heads.

8 Claims, 6 Drawing Sheets

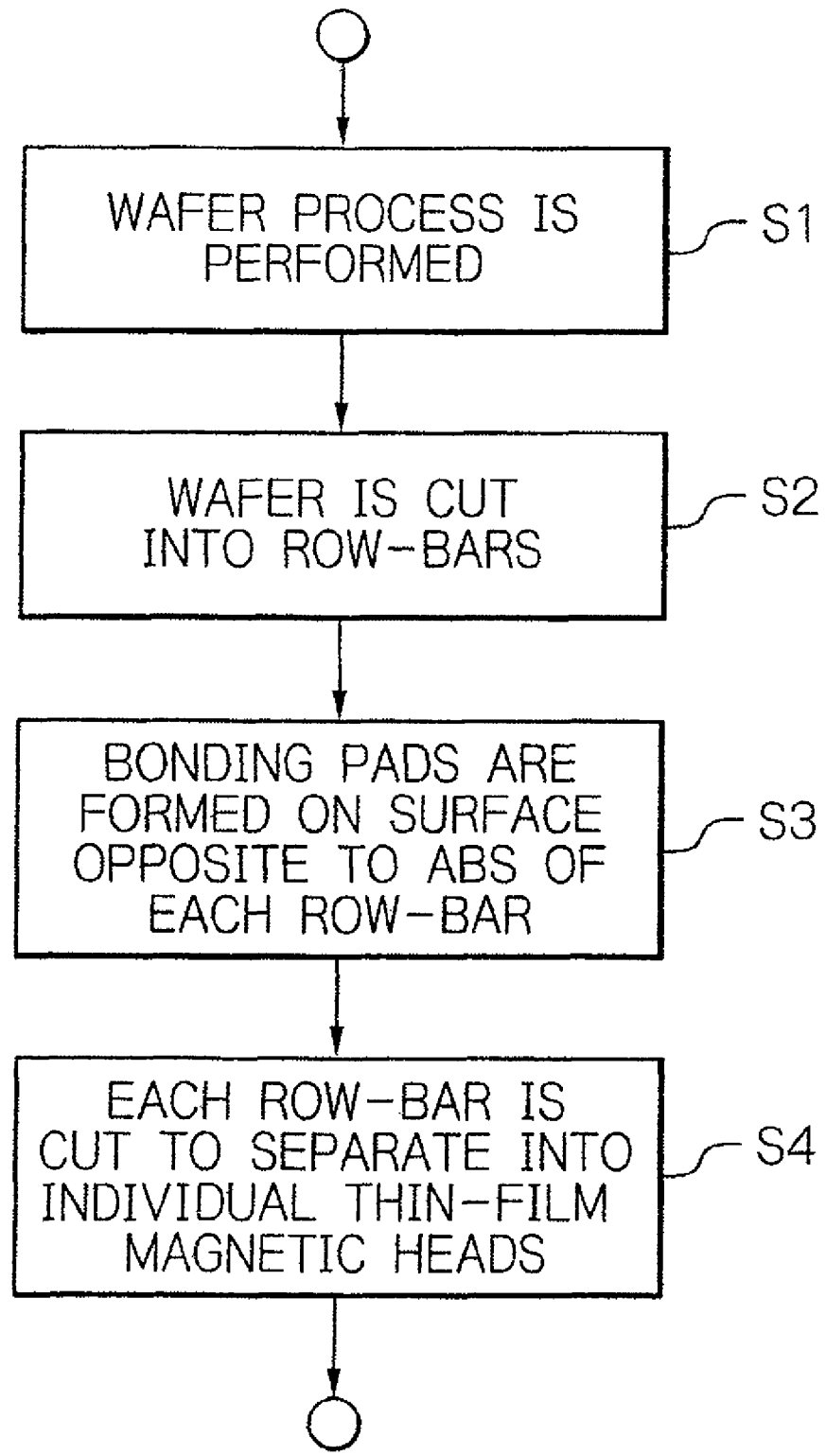

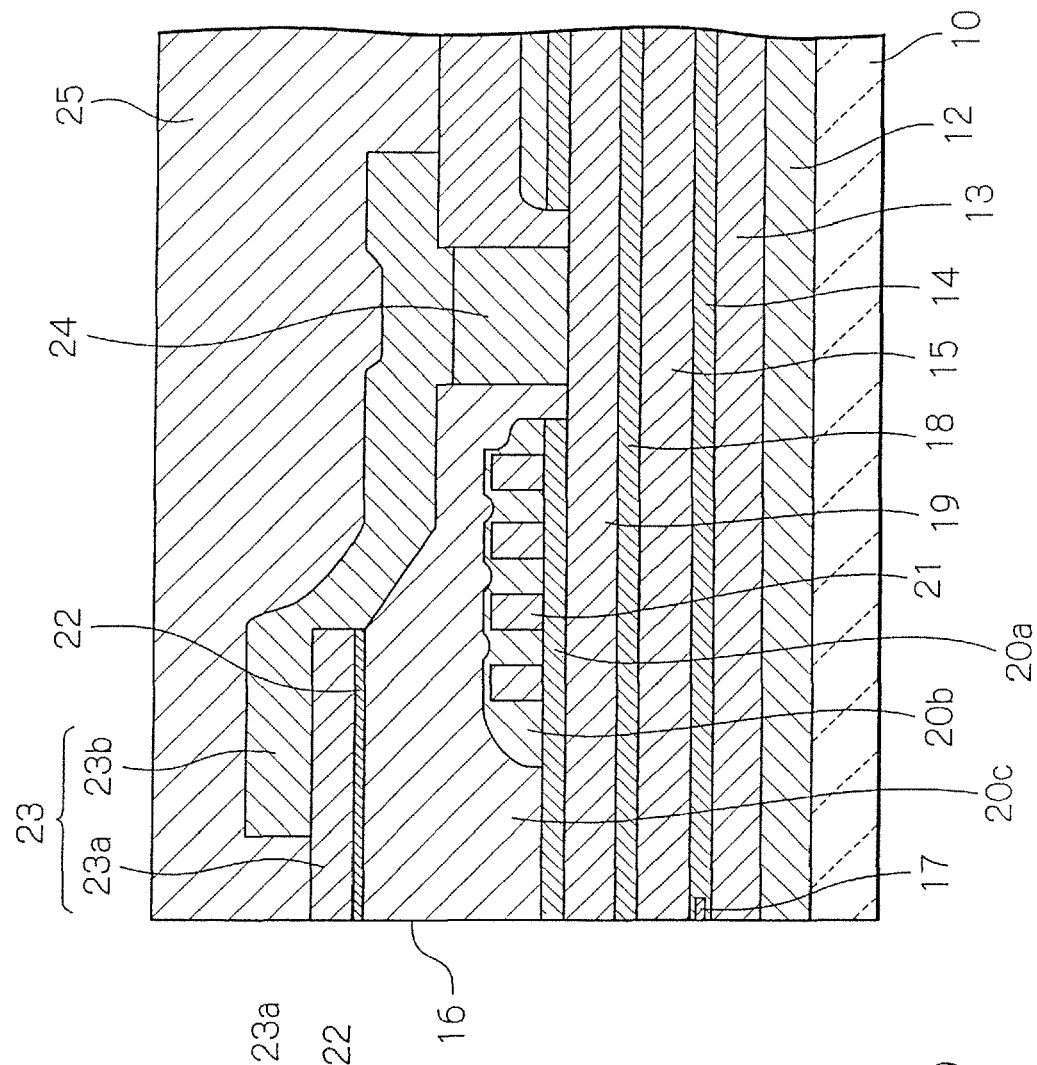

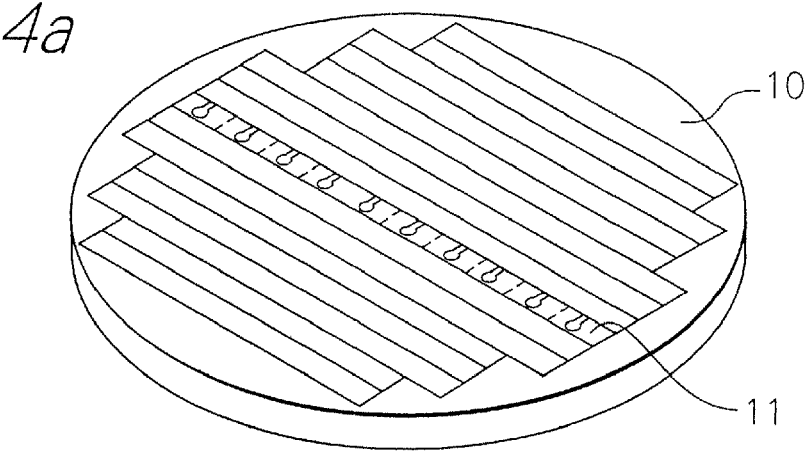
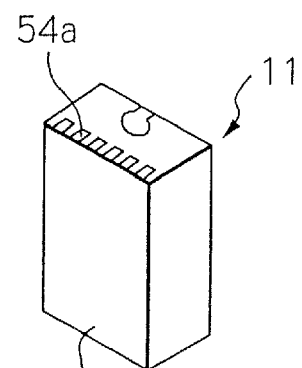
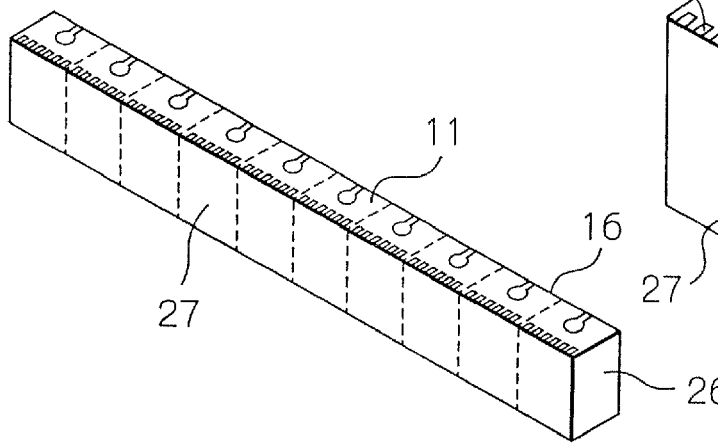
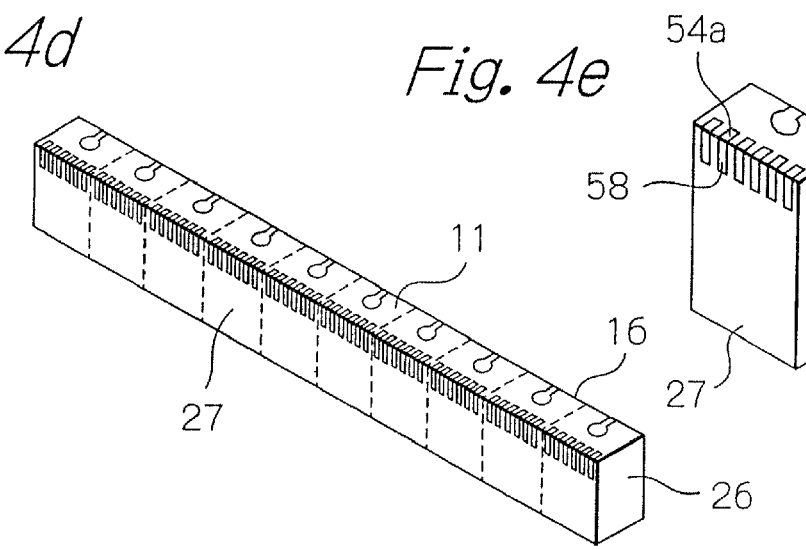

MANUFACTURING METHOD OF THIN-FILM MAGNETIC HEAD, WAFER FOR THIN-FILM MAGNETIC HEAD AND THIN-FILM MAGNETIC HEAD

BACKGROUND OF THE INVENTION

1. Field of the Invention

The present invention relates to a manufacturing method of a thin-film magnetic head, to a wafer for a thin-film magnetic head, and to a thin-film magnetic head.

2. Description of the Related Art

Recently, in accordance with improvement in recording performance of a hard disk drive (HDD) apparatus or of a magnetic tape drive apparatus, it has been requested to enhance performance of a thin-film magnetic head used in the apparatus. A composite type thin-film magnetic head provided with an inductive write head element and a magnetoresistive effect (MR) read head element is typically used as for such thin-film magnetic head. In order to increase the recording bit-density of the HDD apparatus and to advance the flying characteristics and the impact resistance of the thin-film magnetic head, downsizing of the thin-film magnetic head is now brought forward.

In response to further demand for additional downsizing in the magnetic head or chip, it will be necessary to scale down an area of an element-formed region or a pattern-formed region of the thin-film magnetic head.

However, because it must reserve a region with an area of for example several tens μm×several tens μm, for forming bonding pads in this pattern-formed region, it is difficult to enough reduce the chip size. That is, the area of the pattern-formed region cannot be reduced lower than the minimum-bonding margin and thus there is difficulty in downsizing of the chip.

As a conventional art capable of solving such problems, Japanese utility model publication No. 7-032705 discloses forming of bonding pads on a back surface opposite to an air bearing surface (ABS) of a magnetic head slider. However, forming of such bonding pads on the back of the magnetic head slider can only be performed after the wafer is cut into row-bars each having a plurality of thin-film magnetic heads aligned. Namely, there is no bonding pad on an integrated surface of the wafer during the wafer process state and therefore it is impossible to evaluate electrical characteristics of each thin-film magnetic head during this wafer process.

U.S. Pat. Nos. 6,274,222 B1 and 7,092,212 B2 disclose a scheme in which, in order to increase the number of thin-film magnetic heads obtained from a wafer and to reduce a margin used in cutting, lapping sensors are formed in a space between adjacent lines of thin-film magnetic heads on the wafer and the wafer is cut through this space for the lapping sensors. This scheme can certainly reduce a longitudinal dimension or dimension along a track-width direction in an element-formed surface of the thin-film magnetic head. However, even if the longitudinal size in the element-formed surface is reduced, the chip size cannot be greatly reduced. In order to obtain a big reduction in chip size, it is necessary to reduce the dimension of the short hand direction, that is, the dimension in a direction perpendicular to the track-width direction in the element-formed surface of the thin-film magnetic head.

SUMMARY OF THE INVENTION

It is therefore an object of the present invention to provide a manufacturing method of a thin-film magnetic head, a wafer for a thin-film magnetic head, and a thin-film magnetic head, whereby electrical pads can be utilized even during a wafer process and also a chip size can be greatly reduced.

According to the present invention, a manufacturing method of a thin-film magnetic head includes a step of forming many thin-film magnetic heads arranged along row and column directions on a wafer, each of the thin-film magnetic heads having a read head element, a write head element, and pairs of probe-use pads electrically connected with the read head element and the write head element, respectively, the pairs of probe-use pads being positioned so that at least part of each probe-use pad is removed by a cutting process along the row direction, a step of obtaining a plurality of row-bars by cutting the wafer along the row direction so that the at least part of each probe-use pad is removed, each of the obtained row-bars having the thin-film magnetic heads aligned in the row direction, a step of forming pairs of bonding pads electrically connected with the read head element and the write head element, respectively, on a surface opposite to an ABS of each thin-film magnetic head of each of the row-bars, and a step of cutting each row-bar along the column direction to separate into individual thin-film magnetic heads.

In this specification, it is defined that a row direction of a wafer is a longitudinal direction of a row-bar to be cut. This row direction corresponds to a track-width direction of the thin-film magnetic head. Also, it is defined that a column direction of the wafer is a perpendicular direction to the row direction in the wafer surface or a lateral direction of the row-bar to be cut. This column direction corresponds to a perpendicular direction to the track-width direction of the thin-film magnetic head.

The pairs of probe-use pads are formed at positions so that at least part of each probe-use pad is removed by a cutting process along the row direction and in fact when the wafer is cut along the row direction for obtaining row-bars, the at least part of each probe-use pad is removed. Then, the bonding pads are formed on the surface of the cut row-bar opposite to the ABS. During the wafer process, the whole regions of the probe-use pads exist and thus can be utilized for measuring electrical characteristics of the thin-film magnetic heads. The electrical characteristics in this case are for example resistance characteristics of the MR read head elements, QST (Quasi Static Test) evaluation characteristics of the MR read head elements, and resistances and inductance characteristics of the inductive write head elements. If there are heater elements, the electrical characteristics contain resistance characteristics of the heater elements. Since at least a part of each probe-use pads is removed by the cutting process to separate into the row-bars, a private area of the probe-use pads in the element-formed surface of the finally obtained thin-film magnetic head becomes extremely small. Whereas since the bonding pads are formed on the surface opposite to the ABS, enough bonding area can be assured although no private area of the bonding pads is utilized in the element-formed surface. As a result, it is possible to extremely reduce the chip size and to know electrical characteristics of the thin-film magnetic heads even during the wafer process. Furthermore, because the thin-film magnetic head can be fabricated thin, its weight becomes light to improve the impact resistance. Of course the number of the thin-film magnetic heads fabricated from a single wafer can be increased.

It is preferred that the step of forming many thin-film magnetic heads on a wafer includes a step of forming the pairs of probe-use pads at positions so that only a part of each probe-use pad is removed by the cutting process along the row direction, and that the step of obtaining a plurality of row-bars includes a step of cutting the wafer along the row direction so that only a part of each probe-use pad is removed.

In this case, preferably, the step of forming pairs of bonding pads includes a step of forming the pairs of bonding pads, each of which is electrically connected with a remained part of each probe-use pad.

Also, in this case, preferably, the step of forming many thin-film magnetic heads on a wafer includes a step of forming pairs of lead conductors having one ends electrically connected with the read head element and the write head element, respectively, and the other ends electrically connected with one ends of pairs of bumps, respectively, the other ends of the pairs of bumps being electrically connected with the pairs of probe-use pads. More preferably, the step of obtaining a plurality of row-bars includes a step of cutting the wafer along the row direction so that only a part of each probe-use pad, only a part of each bump and only a part of each lead conductor are removed, and the step of forming pairs of bonding pads includes a step of forming the pairs of bonding pads, each of which is electrically connected with a remained part of each probe-use pad, a remained part of each bump and a remained part of each lead conductor.

It is further preferred that the step of forming many thin-film magnetic heads on a wafer includes a step of forming the pairs of probe-use pads at positions so that all of the pairs of probe-use pads are removed by the cutting process along the row direction, and that the step of obtaining a plurality of row-bars includes a step of cutting the wafer along the row direction so that all of the pairs of probe-use pads are removed. In this case, preferably, the step of forming many thin-film magnetic heads on a wafer includes a step of forming pairs of lead conductors having one ends electrically connected with the read head element and the write head element, respectively, and the other ends electrically connected with one ends of pairs of bumps, respectively, the other ends of the pairs of bumps being electrically connected with the pairs of bonding pads. More preferably, the step of obtaining a plurality of row-bars includes a step of cutting the wafer along the row direction so that all of the pairs of probe-use pads, only a part of each bump and only a part of each lead conductor are removed, and the step of forming pairs of bonding pads includes a step of forming the pairs of bonding pads, each of which is electrically connected with a remained part of each bump and a remained part of each lead conductor.

It is still further preferred that each probe-use pad is formed to have an area smaller than that of each bonding pad.

It is further preferred that the method further includes a step of measuring, using the pairs of probe-use pads, electrical characteristics of each thin-film magnetic head before the step of obtaining a plurality of row-bars is executed.

According to the present invention, also, a wafer for a thin-film magnetic head, includes many thin-film magnetic heads arranged along row and column directions. Each of the thin-film magnetic heads includes a read head element, a write head element, and pairs of probe-use pads electrically connected with the read head element and the write head element, respectively, the pairs of probe-use pads being positioned so that at least part of each probe-use pad is removed by a cutting process along the row direction.

The pairs of probe-use pads are formed at positions so that at least part of each probe-use pad is removed by a cutting process along the row direction. Since the probe-use pads exist on the wafer, it is possible to measure electrical characteristics of the thin-film magnetic heads on the wafer using these probe-use pads. The electrical characteristics in this case are for example resistance characteristics of the MR read head elements, QST evaluation characteristics of the MR read head elements, and resistances and inductance characteristics of the inductive write head elements. If there are heater elements, the electrical characteristics contain resistance characteristics of the heater elements. Since at least a part of each probe-use pads is removed by the cutting process to separate into the row-bars, a private area of the probe-use pads in the element-formed surface of the finally obtained thin-film magnetic head becomes extremely small or zero. As a result, it is possible to extremely reduce the chip size and to know electrical characteristics of the thin-film magnetic heads even during the wafer process. Furthermore, because the thin-film magnetic head can be fabricated thin, its weight becomes light to improve the impact resistance. Of course the number of the thin-film magnetic heads fabricated from a single wafer can be increased.

It is preferred that each of the thin-film magnetic heads further includes pairs of lead conductors having one ends electrically connected with the read head element and the write head element, respectively, and the other ends electrically connected with one ends of pairs of bumps, respectively, the other ends of the pairs of bumps being electrically connected with the pairs of probe-use pads.

According to the present invention, further, a thin-film magnetic head, includes a read head element, a write head element, pairs of probe-use pads electrically connected with the read head element and the write head element, respectively, the pairs of probe-use pads being formed on an element-formed surface that is perpendicular to an ABS, and pairs of bonding pads electrically connected with the pairs of probe-use pads, respectively, the pairs of bonding pads being formed on a surface that is opposite to the ABS.

The pairs of probe-use pads are formed on an element-formed surface that is perpendicular to the ABS and the pairs of bonding pads are formed on a surface that is opposite to the ABS. Therefore, during the wafer process, the probe-use pads exist and thus can be utilized for measuring electrical characteristics of the thin-film magnetic heads. The electrical characteristics in this case are for example resistance characteristics of the MR read head elements, QST evaluation characteristics of the MR read head elements, and resistances and inductance characteristics of the inductive write head elements. If there are heater elements, the electrical characteristics contain resistance characteristics of the heater elements. Since the probe-use pads are used only to contact with probes, it is possible to make its area small and therefore a private area of the probe-use pads in the element-formed surface of the finally obtained thin-film magnetic head becomes extremely small. Whereas since the bonding pads are formed on the surface opposite to the ABS, enough bonding area can be assured although no private area of the bonding pads is utilized in the element-formed surface. As a result, it is possible to extremely reduce the chip size and to know electrical characteristics of the thin-film magnetic heads even during the wafer process. Furthermore, because the thin-film magnetic head can be fabricated thin, its weight becomes light to improve the impact resistance. Of course the number of the thin-film magnetic heads fabricated from a single wafer can be increased.

It is preferred that each probe-use pad and each bonding pad electrically connected to the each probe-use pad have a L-shaped section.

It is also preferred that the thin-film magnetic head further includes pairs of lead conductors having one ends electrically connected with the read head element and the write head element, respectively, and the other ends electrically connected with one ends of pairs of bumps, respectively, the other ends of the pairs of bumps being electrically connected with the pairs of probe-use pads, the pairs of bonding pads being connected with the pairs of lead conductors, the pairs of bumps and the pairs of probe-use pads.

It is further preferred that each probe-use pad has an area smaller than that of each bonding pad.

Further objects and advantages of the present invention will be apparent from the following description of the preferred embodiments of the invention as illustrated in the accompanying drawings.

BRIEF DESCRIPTION OF THE DRAWINGS

FIG. 1 is a flow chart extremely schematically illustrating a manufacturing process of a thin-film magnetic head in an embodiment according to the present invention;

FIGS. 2a and 2b are sectional views illustrating a layer configuration example of particularly a head element part of the thin-film magnetic head fabricated in a wafer process shown in FIG. 1, respectively, where FIG. 2a indicates a section seen from the ABS side and FIG. 2b indicates a B-B section of FIG. 2a;

FIGS. 4a to 4e are perspective views illustrating a wafer, a row-bar and an enlarged part of the row-bar fabricated in the manufacturing process shown in FIG. 1, respectively;

DESCRIPTION OF THE PREFERRED EMBODIMENTS

Figure 3A:
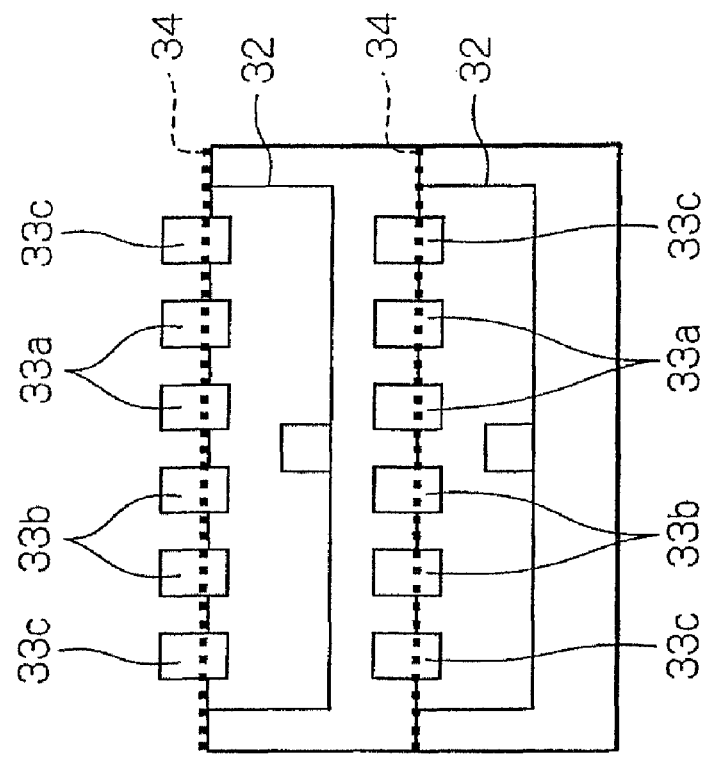
FIGS. 3a and 3b are views illustrating positions of pads fabricated based on the conventional art and based on the manufacturing process in the embodiment according to the present invention, respectively.
Figure 3B:
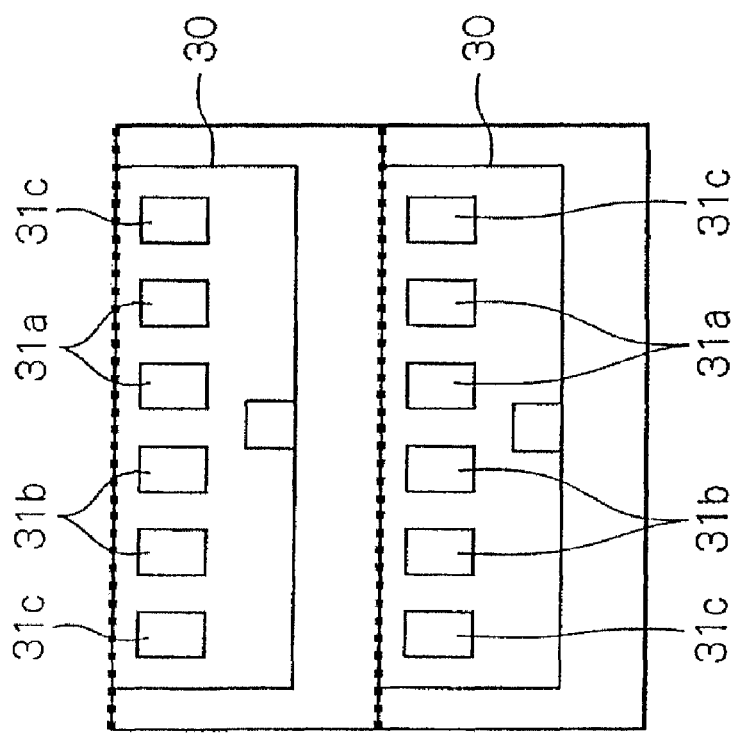
Figure 5A:
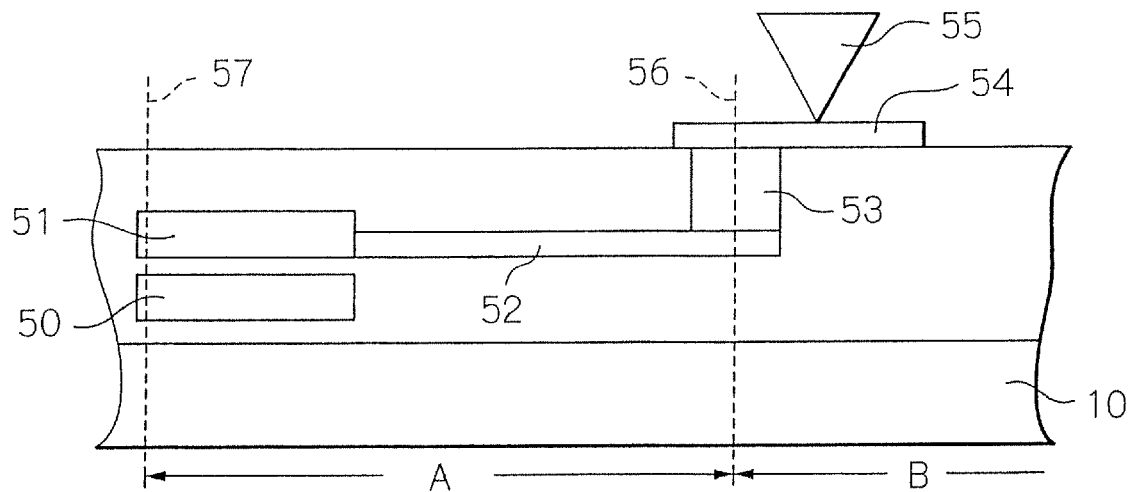
FIGS. 5a to 5c are sectional views along a plane perpendicular to the ABS, illustrating a head element part of the thin-film magnetic head fabricated by the above-mentioned embodiment.
Figure 5B:
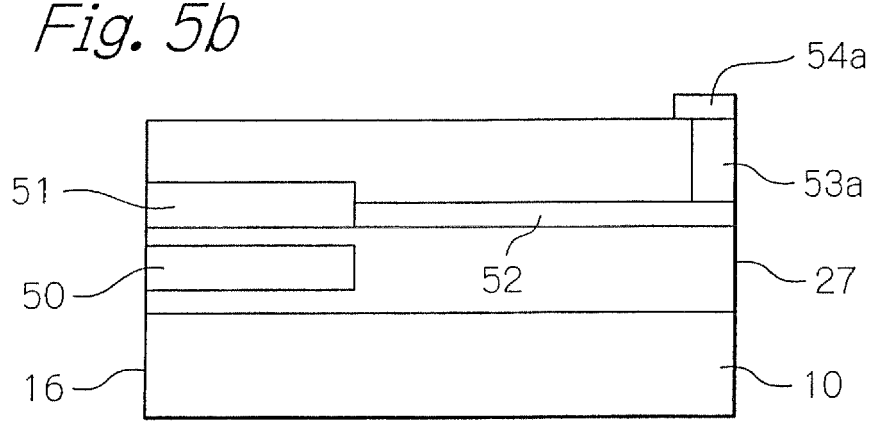
Figure 5C:
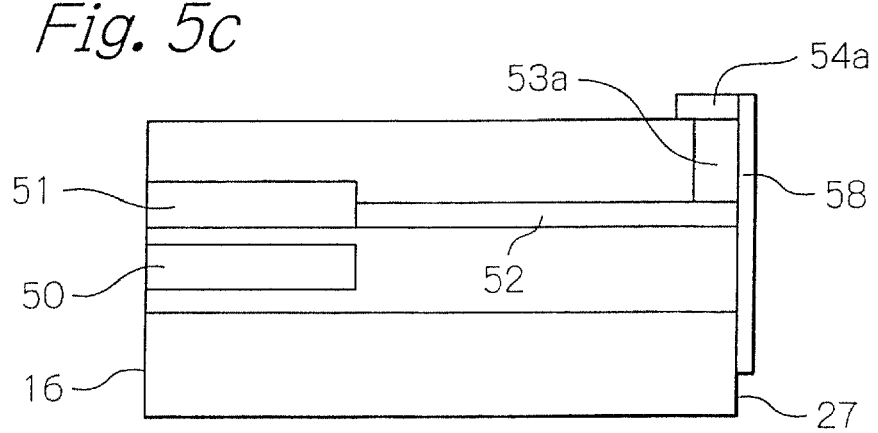

FIG. 1 extremely schematically illustrates a manufacturing process of a thin-film magnetic head in an embodiment according to the present invention, FIGS. 2a and 2b illustrate a layer configuration example of the thin-film magnetic head fabricated in a wafer process shown in FIG. 1, FIGS. 3a and 3b illustrate positions of pads fabricated based on the conventional art and based on the manufacturing process in the embodiment according to the present invention, FIGS. 4a to 4e illustrate a wafer, a row-bar and an enlarged part of the row-bar fabricated in this manufacturing process, and FIGS. 5a to 5c illustrate, as a section along a plane perpendicular to the ABS, a head element part of the thin-film magnetic head fabricated by this embodiment, respectively. Hereinafter, the manufacturing process of the thin-film magnetic head in this embodiment according to the present invention will be described with reference to these figures.

At first, a wafer process is executed (Step S1). In this wafer process, as shown in FIG. 4a, many thin-film magnetic heads 11 are formed by a thin-film fabrication technology on a wafer 10 made of a ceramic material such as AlTiC ($Al_2O_3$—TiC). Each thin-film magnetic head element is provided with a magnetoresistive effect (MR) read head element such as a tunnel magnetoresistive effect (TMR) read head element or a giant magnetoresistive effect (GMR) read head element, and an inductive write head element such as an in-plane or horizontal magnetic recording type inductive write head element or a perpendicular magnetic recording type inductive write head element.

An example of a layer configuration of the thin-film magnetic head fabricated by this wafer process is as follows. As shown in FIGS. 2a and 2b, an insulation layer 12 made of for example alumina ($Al_2O_3$), a lower shield and electrode layer 13 made of for example permalloy (NiFe), a shield gap layer 14 made of for example alumina, and an upper shield and electrode layer 15 made of for example permalloy are sequentially stacked in this order on the wafer or substrate 10. In the shield gap layer 14, an MR multi-layered structure 17 such as a TMR multi-layered structure or a GMR multi-layered structure is formed to expose with a covered coating film to an ABS 16. These lower shield and electrode layer 13, the shield gap layer 14, the upper shield and electrode layer 15 and the MR multi-layered structure 17 constitute an MR read head element.

On the upper shield and electrode layer 15, a separation layer 18 made of for example alumina and an auxiliary pole layer 19 made of for example permalloy are sequentially stacked. On the auxiliary pole layer 19, a thin-film coil 21 made of for example copper (Cu) surrounded by or embedded in gap layers 20a, 20b and 20c made of for example alumina or silicon oxide ($SiO_2$) is formed.

On the gap layer 20c, a seed layer 22 and a pole section 23a of a main pole layer 23 made of for example permalloy are formed and also a yoke section 23b of the main pole layer 23 is formed. In most case, a top end part of the pole section 23a is made of a magnetic material with a saturation magnetic flux density larger than that of permalloy. The yoke section 23b of the main pole layer 23 is magnetically connected with the auxiliary pole layer 19 via a connection section 24 set back far from the ABS 16.

An overcoat layer 25 made of for example alumina is formed on the main pole layer 23 and on the gap layer 20c.

As will be apparent form FIGS. 2a and 2b, the thin-film magnetic head is configured by a composite type thin-film magnetic head having an MR read head element and a perpendicular magnetic recording type inductive write head element stacked thereon to generate a write magnetic field in a direction perpendicular to a surface of a recording medium.

Although it is not shown in these figures, according to this embodiment, a heater element for heating to induce thermal expansion of the heated area of the head so as to adjust a space between a top end face of the head and a magnetic recording medium is formed in the back of the MR read head element and the inductive write head element from the ABS 16, that is in the outside of the right end of the head in FIG. 2b.

In the wafer process, not only the above-mentioned MR read head elements, inductive write head elements and heater elements but also electrical wirings of these MR read head elements, inductive write head elements and heater elements are fabricated. More concretely, lead conductors with one ends electrically connected with these MR read head elements, inductive write head elements and heater elements are formed by performing photolithography and plating or sputtering of Cu. Bumps are formed by performing photolithography and plating of Cu on the other ends of the lead conductors. Then, after depositing a protection layer made of alumina thereon, the surface is lapped to expose top surfaces of the bumps. Then, external connection pads electrically connected with the MR read head elements, inductive write head elements and heater elements are formed on the surface of the wafer by performing photolithography, plating or sputtering of Cu and plating or sputtering of gold (Au) on the top surfaces of the bumps. According to the present invention, designing in positions of these pads formed is devised.

As shown in FIG. 3a, according to the conventional art, a whole region for a pair of pads 31a connected with the MR read head element, a pair of pads 31*b* connected with the inductive write head element and a pair of pads 31*c* connected with the heater element is formed within a pattern-formed region or element-formed region 30 that will be finally remained after cutting the wafer into row-bars and then each row-bar is lapped to provide an ABS. Thus, according to the conventional art, it is difficult to reduce an area of this element-formed region 30 and therefore to sufficiently reduce the chip size.

Contrary to this, according to this embodiment of the present invention, as shown in FIG. 3*b*, a pair of pads 33*a* connected with the MR read head element, a pair of pads 33*b* connected with the inductive write head element and a pair of pads 33*c* connected with the heater element are formed to remain only a part thereof within a pattern-formed region 32 that will be finally remained after cutting the wafer along a cutting-plane line 34 into row-bars and then each row-bar is lapped to provide an ABS. In other words, these pads 33*a*, 33*b* and 33*c* are formed at positions on the wafer, a part of which is removed by the cutting operation along the row direction to obtain the row-bars. As a result, according to this embodiment, during the wafer process, the whole regions of the respective pads 33*a*, 33*b* and 33*c* exist and are utilized as probe-use pads to which probe pins are contacted to measure electrical characteristics of the elements.

FIG. 5*a* illustrates this measurement operation during wafer process. As will be noted from the figure, an MR read head element 50 and an inductive write head element 51 are formed on the wafer 10. One ends of a pair of lead conductors 52 are electrically connected with this inductive write head element 51, and the other ends of the lead conductors 52 are electrically connected with one ends of bumps 53. The other ends of the bumps 53 are electrically connected with probe-use pads 54 (33*b*) exposed to the wafer surface. Since the whole areas of the probe-use pads 54 are remained at this stage, probe pins 55 can be easily contacted to the probe-use pads 54 for measuring electrical characteristics of the inductive write head element 51. In the figure, a region A between a cutting-plane line 56 for cutting the wafer into row-bars and an ABS line 57 is remained as a thin-film magnetic head, whereas a right-hand region B of the cutting-plane line 56 in FIG. 5*a* is removed for obtaining row-bars.

Then, a machining process is performed (Step S2). In this process, first, the wafer 10 is cut along a row direction to obtain a plurality of row-bars 26. Then, a necessary machining step such as forming of grooves or rails is performed, and thereafter, an ABS 16 of each row-bar 26 is lapped to control characteristics of the thin-film magnetic head.

FIG. 4*b* shows thus obtained row-bar 26 with a plurality of aligned thin-film magnetic heads 11, FIG. 4*c* shows an enlarged thin-film magnetic head 11 of the row-bar 26, and FIG. 5*b* shows in detail a section of this thin-film magnetic head 11. As will be noted from these figures, a part of each probe-use pad 54 is cut and removed along the cutting-plane line 56 so that, within the pattern-formed region of the magnetic head, only a remaining part 54*a* of each probe-use pad stays in. Also, parts 53*a* of the respective bumps 53 are remained. The remaining parts 54*a* of the probe-use pads and the remaining parts 53*a* of the bumps are exposed to a surface 27 opposite to the ABS 16.

Then, as shown in FIGS. 4*d* and 5*c*, bonding pads 58 electrically connected with the respective parts 54*a* of the probe-use pads and the respective parts 53*a* of the bumps are formed on the surface 27 of the row-bar 26 opposite to the ABS 16 (Step S3). These bonding pads 58 are formed by in concrete performing photolithography, plating or sputtering of Cu and plating or sputtering of Au. Dimension of each bonding pad may be for example about 90-100 μm×70-100 μm. FIG. 4*e* shows an enlarged thin-film magnetic head 11 of the row-bar 26 shown in FIG. 4*d*, and FIG. 5*c* shows in detail a section of this thin-film magnetic head 11.

Then, a crown adjustment or a touch lapping for finishing the lapped surface of the row-bar 26 is performed, and thereafter this row-bar is cut to separate into individual thin-film magnetic heads or magnetic head sliders 11 (Step S4).

As described in detail, according to this embodiment, the probe-use pads 54 are formed at positions where a part of the pads 54 is removed by the cutting operation along the row direction in a layer plane of the wafer 10 to separate into the row-bars 26. Therefore, in fact, a part of the probe-use pads 54 is removed by the cutting operation along the row direction in a layer plane of the wafer 10 to separate into the row-bars 26. Then, the bonding pads 58 are formed on the surface 27 of the cut row-bar 26 opposite to the ABS 16. During the wafer process, the whole regions of the probe-use pads exist and thus can be utilized for measuring electrical characteristics of the thin-film magnetic heads. The electrical characteristics in this case are for example resistance characteristics of the MR read head elements, QST evaluation characteristics of the MR read head elements, resistances and inductance characteristics of the inductive write head elements, and resistance characteristics of the heater elements. Since the part of the probe-use pads 54 is removed by the cutting operation to separate into the row-bars 26, a private area of the probe-use pads in the pattern-formed region or element-formed region of the finally obtained thin-film magnetic head becomes extremely small. Whereas since the bonding pads 58 are formed on the surface opposite to the ABS, enough bonding area can be assured although no private area of the bonding pads is utilized in the pattern-formed region or element-formed region. As a result, it is possible to extremely reduce the chip size and to know electrical characteristics of the thin-film magnetic heads even during the wafer process. Furthermore, because the thin-film magnetic head can be fabricated thin, its weight becomes light to improve the impact resistance. Of course the number of the thin-film magnetic heads fabricated from a single wafer can be increased.

In general, a necessary area for the probe-use pad is smaller than that for the bonding pad. Therefore, it is possible to more decrease the area of the probe-use pad in the pattern-formed region or element-formed region.

Figure 6A:
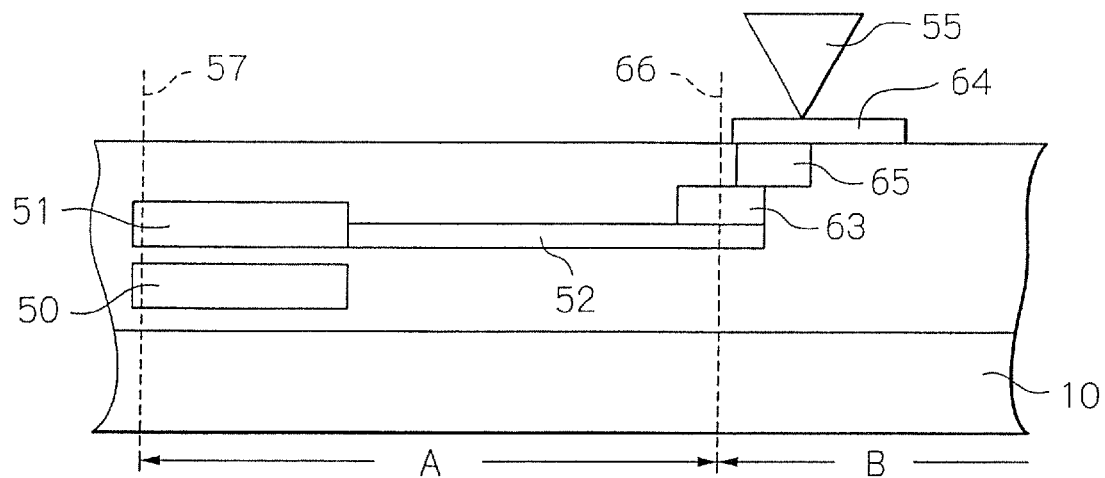
FIGS. 6a to 6c are sectional views along a plane perpendicular to the ABS, illustrating a head element part of the thin-film magnetic head fabricated by another embodiment according to the present invention.
Figure 6B:
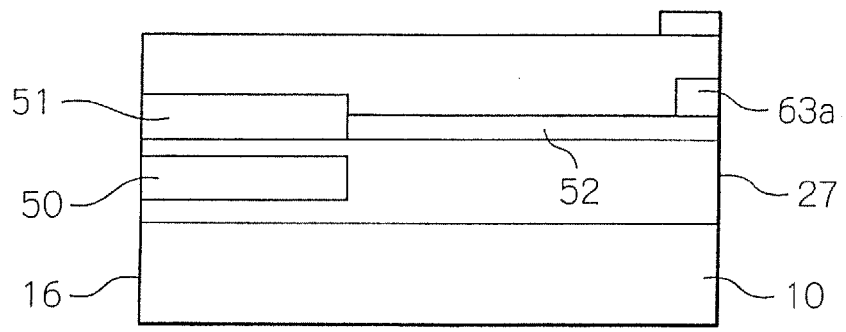
Figure 6C:
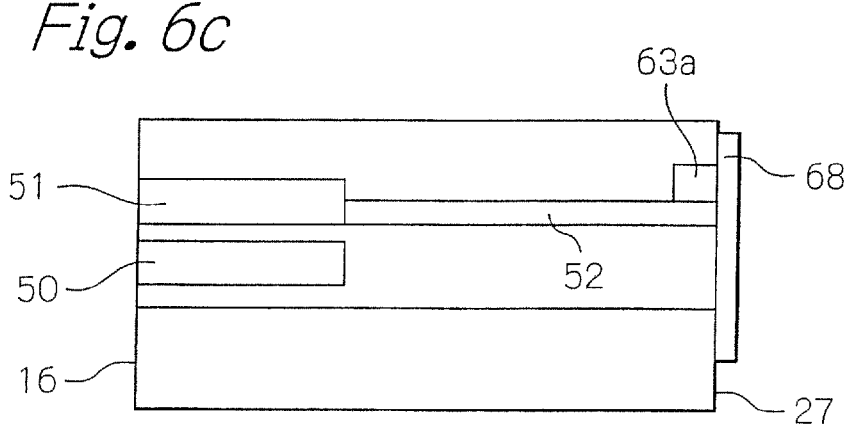

FIGS. 6*a* to 6*c* illustrate, in sections along a plane perpendicular to the ABS, a head element part of the thin-film magnetic head fabricated by another embodiment according to the present invention. This embodiment has the similar configurations operations and advantages as those in the aforementioned embodiment except that all of probe-use pads are removed when obtaining row-bars. Therefore, in this embodiment, the same reference numerals are used for the similar elements as these in the aforementioned embodiment.

At first, a wafer process is performed (Step S1 in FIG. 1). This wafer process differs from that in the aforementioned embodiment in the following points.

As shown in FIG. 6*a*, an MR read head element 50 and an inductive write head element 51 are formed on a substrate 10. One ends of a pair of lead conductors 52 are electrically connected with this inductive write head element 51, and the other ends of the lead conductors 52 are electrically connected with one ends of first bumps 63. The other ends of the first bumps 63 are electrically connected with one ends of second bumps 65. The other ends of the second bumps 65 are electrically connected with probe-use pads 64 exposed to the wafer surface. Since the whole areas of the probe-use pads 64 are remained at this stage, probe pins 55 can be easily contacted to the probe-use pads 64 for measuring electrical characteristics of the inductive write head element 51. In the figure, a region A between a cutting-plane line 66 for cutting the wafer into row-bars and an ABS line 57 is remained as a thin-film magnetic head, whereas a right-hand region B of the cutting-plane line 66 in FIG. 6a is removed for obtaining row-bars. Thus, in this embodiment, the whole are of the probe-use pads 64 positions within the region B removed for obtaining row-bars.

Then, a machining process is performed (Step S2 in FIG. 1). In this process, first, the wafer 10 is cut along a row direction to obtain a plurality of row-bars. Then, a necessary machining step such as forming of grooves or rails is performed, and thereafter, an ABS 16 of each row-bar is lapped to control characteristics of the thin-film magnetic head.

As shown in FIG. 6b, by the cutting operation along the cutting-plane line 66 shown in FIG. 6a, all of each probe-use pad 64 is removed. Parts 63a of the respective first bumps 63 are remained but all of the second bumps 65 are removed. The remaining parts 63a of the first bumps are exposed to a surface 27 opposite to the ABS 16.

Then, as shown in FIG. 6c, bonding pads 68 electrically connected with the respective parts 63a of the first bumps are formed on the surface 27 of the row-bar opposite to the ABS 16 (Step S3 in FIG. 1). These bonding pads 68 are formed by in concrete performing photolithography, plating or sputtering of Cu and plating or sputtering of Au.

Then, a crown adjustment or a touch lapping for finishing the lapped surface of the row-bar is performed, and thereafter this row-bar is cut to separate into individual thin-film magnetic heads or magnetic head sliders (Step S4 in FIG. 1).

As described in detail, according to this embodiment, the probe-use pads 64 are formed at positions where all of the pads 64 are removed by the cutting operation along the row direction in a layer plane of the wafer 10 to separate into the row-bars 26. Therefore, in fact, all of the probe-use pads 64 are removed by the cutting operation along the row direction in a layer plane of the wafer 10 to separate into the row-bars. Then, the bonding pads 68 are formed on the surface 27 of the cut row-bar opposite to the ABS 16. During the wafer process, the whole regions of the probe-use pads exist and thus can be utilized for measuring electrical characteristics of the thin-film magnetic heads. The electrical characteristics in this case are for example resistance characteristics of the MR read head elements, QST evaluation characteristics of the MR read head elements, resistances and inductance characteristics of the inductive write head elements, and resistance characteristics of the heater elements. Since all of the probe-use pads 64 are removed by the cutting operation to separate into the row-bars, a private area of the probe-use pads in the pattern-formed region or element-formed region of the finally obtained thin-film magnetic head becomes zero. Whereas since the bonding pads 68 are formed on the surface opposite to the ABS, enough bonding area can be assured although no private area of the bonding pads is utilized in the pattern-formed region or element-formed region. As a result, it is possible to extremely reduce the chip size and to know electrical characteristics of the thin-film magnetic heads even during the wafer process. Furthermore, because the thin-film magnetic head can be fabricated thin, its weight becomes light to improve the impact resistance. Of course the number of the thin-film magnetic heads fabricated from a single wafer can be increased.

In general, a necessary area for the probe-use pad is smaller than that for the bonding pad. Therefore, it is possible to more decrease the area of the probe-use pad in the pattern-formed region or element-formed region.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A manufacturing method of a thin-film magnetic head, comprising the steps of:

forming many thin-film magnetic heads arranged along row and column directions on a wafer, each of the thin-film magnetic heads having a read head element, a write head element, pairs of lead conductors having one ends electrically connected with said read head element and said write head element, respectively, pairs of first bumps having one ends electrically connected with the other ends of said pairs of lead conductors, pairs of second bumps having one ends electrically connected with the other ends of said pairs of first bumps, and pairs of probe-use pads electrically connected with the other ends of said pairs of second bumps, said pairs of probe-use pads being positioned so that all of said pairs of probe-use pads are removed by a cutting process along the row direction, said pairs of first bumps being positioned so that at least part of each first bumps is removed by the cutting process along the row direction, said pairs of second bumps being positioned so that all of said pairs of second bumps are removed by the cutting process along the row direction;

obtaining a plurality of row-bars by cutting said wafer along the row direction so that all of said pairs of probe-use pads are removed, each of the obtained row-bars having the thin-film magnetic heads aligned in the row direction;

forming pairs of bonding pads electrically connected with said read head element and said write head element, respectively, on a surface opposite to an air bearing surface of each thin-film magnetic head of each of said row-bars; and cutting each row-bar along the column direction to separate into individual thin-film magnetic heads.

2. The manufacturing method as claimed in claim 1, wherein the step of obtaining a plurality of row-bars comprises a step of cutting said wafer along the row direction so that all of said pairs of probe-use pads, all of said pairs of second bumps, only a part of each first bump and only a part of each lead conductor are removed, and wherein the step of forming pairs of bonding pads comprises a step of forming said pairs of bonding pads, each of which is electrically connected with a remained part of each first bump and a remained part of each lead conductor.

3. The manufacturing method as claimed in claim 1, wherein each probe-use pad is formed to have an area smaller than that of each bonding pad.

4. The manufacturing method as claimed in claim 1, wherein said method further comprises a step of measuring, using said pairs of probe-use pads, electrical characteristics of each thin-film magnetic head before the step of obtaining a plurality of row-bars is executed.

5. A wafer for a thin-film magnetic head, including many thin-film magnetic heads arranged along row and column directions, each of the thin-film magnetic heads comprising:
a read head element;
a read head element;

pairs of lead conductors having one ends electrically connected with said read head element and said write head element, respectively;
pairs of first bumps having one ends electrically connected with the other ends of said pairs of lead conductors;
pairs of second bumps having one ends electrically connected with the other ends of said pairs of first bumps; and
pairs of probe-use pads electrically connected with the other ends of said pairs of second bumps,
said pairs of probe-use pads being positioned so that all of said pairs of probe-use pads are removed by a cutting process along the row direction, said pairs of first bumps being positioned so that at least part of each first bump is removed by the cutting process along the row direction, said pairs of second bumps being positioned so that all of said pairs of second bumps are removed by the cutting process along the row direction.

6. A thin-film magnetic head, comprising:
a read head element;
a write head element;
pairs of probe-use pads electrically connected with said read head element and said write head element, respectively, said pairs of probe-use pads being formed on an element-formed surface that is perpendicular to an air bearing surface; and
pairs of bonding pads electrically connected with said pairs of probe-use pads, respectively, said pairs of bonding pads being formed on a surface that is opposite to the air bearing surface so that no private area of said pairs of bonding pads is utilized in the element-formed surface; and
pairs of lead conductors having one ends electrically connected with said read head element and said write head element, respectively, and the other ends electrically connected with one ends of pairs of bumps, respectively,
the other ends of said pairs of bumps being electrically connected with said pairs of probe-use pads,
said pairs of bonding pads being electrically connected with the other ends of said pairs of lead conductors, said pairs of bumps and said pairs of probe-use pads.

7. The thin-film magnetic head as claimed in claim 6, wherein each probe-use pad and each bonding pad electrically connected to the each probe-use pad have a L-shaped section.

8. The thin-film magnetic head as claimed in claim 6, wherein each probe-use pad has an area smaller than that of each bonding pad.

* * * * *